US012476565B2

(12) United States Patent
Yoshida et al.

(10) Patent No.: US 12,476,565 B2
(45) Date of Patent: Nov. 18, 2025

(54) POWER CONVERTER AND DRIVE CONTROLLER

(71) Applicant: Mitsubishi Electric Corporation, Tokyo (JP)

(72) Inventors: Yukihiro Yoshida, Tokyo (JP); Tatsuro Okubo, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 365 days.

(21) Appl. No.: 18/044,762

(22) PCT Filed: Sep. 16, 2020

(86) PCT No.: PCT/JP2020/035152
§ 371 (c)(1),
(2) Date: Mar. 9, 2023

(87) PCT Pub. No.: WO2022/059106
PCT Pub. Date: Mar. 24, 2022

(65) Prior Publication Data
US 2023/0387843 A1 Nov. 30, 2023

(51) Int. Cl.
H02P 21/18 (2016.01)
B60L 50/51 (2019.01)
(Continued)

(52) U.S. Cl.
CPC ............ H02P 21/18 (2016.02); B60L 50/51 (2019.02); H02P 21/22 (2016.02); H02P 27/06 (2013.01); B60L 2240/423 (2013.01)

(58) Field of Classification Search
CPC .......... H02P 21/18; H02P 21/22; H02P 27/06; B60L 50/51; B60L 2240/423
See application file for complete search history.

(56) References Cited

U.S. PATENT DOCUMENTS

2008/0042606 A1    2/2008  Chen
2011/0140642 A1*   6/2011  Kono ............... B60L 15/025
                                                    318/139
(Continued)

FOREIGN PATENT DOCUMENTS

JP   2008048541 A     2/2008
JP   2014087116   *   5/2014
JP   2014087116 A     5/2014

OTHER PUBLICATIONS

Translation of JP2014087116 has been attached.*
(Continued)

Primary Examiner — Zoheb S Imtiaz
(74) Attorney, Agent, or Firm — BUCHANAN, INGERSOLL & ROONEY PC

(57) ABSTRACT

A power conversion device includes a power converter to convert power generated by a power generator into power to be supplied to a load, a target torque calculator to calculate a target torque of the power generator in accordance with an operation state of the load, and a power conversion controller to control the power converter based on a torque current command value and an exciting current command value for causing an output torque of the power generator to approach the target torque. Absolute values of the torque current command value and the exciting current command value calculated by the power conversion controller during the power generation by the power generator have a positive correlation.

20 Claims, 10 Drawing Sheets

(51) Int. Cl.
  *H02P 21/22*    (2016.01)
  *H02P 27/06*    (2006.01)

(56) References Cited

U.S. PATENT DOCUMENTS

| | | | | |
|---|---|---|---|---|
| 2013/0066501 | A1* | 3/2013 | Oyama | B62D 6/08 |
| | | | | 701/22 |
| 2017/0232851 | A1* | 8/2017 | Unno | B60L 7/14 |
| | | | | 307/10.1 |
| 2017/0317635 | A1* | 11/2017 | Campbell | H02P 21/02 |
| 2018/0234030 | A1* | 8/2018 | Kamiko | H02M 7/5395 |
| 2020/0021227 | A1* | 1/2020 | Lee | H02P 27/085 |
| 2021/0036645 | A1* | 2/2021 | Yokoyama | H02P 6/06 |
| 2021/0086804 | A1* | 3/2021 | Otsubo | B60L 9/18 |
| 2023/0170818 | A1* | 6/2023 | Toba | H02M 1/14 |
| | | | | 363/34 |
| 2024/0042867 | A1* | 2/2024 | Hara | B60L 15/08 |

OTHER PUBLICATIONS

Office Action dated Aug. 4, 2023, issued in the corresponding Indian Patent Application No. 202327008189, 6 pages.
International Search Report (PCT/ISA/210) with translation and Written Opinion (PCT/ISA/237) mailed on Dec. 15, 2020, by the Japan Patent Office as the International Searching Authority for International Application No. PCT/JP2020/035152. 10 pages.
Japanese Office Action mailed on Nov. 15, 2022, by the Japan Patent Office for Application No. 2022-550104 and the English translation. 10 pages.

\* cited by examiner

POWER CONVERTER AND DRIVE CONTROLLER

TECHNICAL FIELD

The present disclosure relates to a power conversion device and a drive control apparatus.

BACKGROUND ART

Power conversion devices mounted on vehicles convert power supplied from a power generator driven by an internal-combustion engine into power to be supplied to a load, and supply the power resulting from the conversion to the load. Patent Literature 1 describes an example of such power conversion devices. The power conversion device described in Patent Literature 1 includes a converter that converts alternating current (AC) power supplied from a power generator that is driven by an internal-combustion engine to generate power into direct current (DC) power, and an inverter that converts an output from the converter into AC power and supplies the AC power to an induction motor. The induction motor is driven by the power supplied from the inverter to produce the driving force of a vehicle.

CITATION LIST

Patent Literature

Patent Literature 1: Unexamined Japanese Patent Application Publication No. 2014-87116

SUMMARY OF INVENTION

Technical Problem

To cause the output torque of the power generator to reach a target torque, the exciting current and the torque current of the power generator are controlled. More specifically, a controller calculates an exciting current command value and a torque current command value that cause the output torque of the power generator to reach the target torque, and controls the converter based on the exciting current command value and the torque current command value. Thus, the output torque of the power generator is controlled.

In this case, the absolute value of the exciting current command value is maintained at a constant value corresponding to the maximum torque of the power generator. When a vehicle including the power conversion device described in Patent Literature 1 coasts, the load of the power generator is low due to the target torque of the power generator lower than the maximum torque. When the load of the power generator is low, the absolute value of the exciting current command value is maintained at a constant value corresponding to the maximum torque of the power generator as described above. In this case, the efficiency of the power generator is lower than when the load of the power generator high.

In response to the above issue, an objective of the present disclosure is to provide a power conversion device and a drive control apparatus that improve the efficiency of a power generator.

Solution to Problem

To achieve the above objective, a power conversion device according to an aspect of the present disclosure includes a power converter, a target torque calculator, and a power conversion controller. The power converter supplies exciting power to a power generator drivable in an excitation state by a power source to generate power, converts the power generated by the power generator into power to be supplied to a load, and supplies the power resulting from the conversion to the load. The target torque calculator calculates a target torque of the power generator in accordance with an operation state of the load. During the power generation by the power generator, the power conversion controller calculates a torque current command value and an exciting current command value for causing an output torque of the power generator to approach the target torque and controls the power converter based on the calculated torque current command value and the calculated exciting current command value. Absolute values of the torque current command value and the exciting current command value calculated by the power conversion controller during the power generation by the power generator have a positive correlation.

Advantageous Effects of Invention

In the above aspect of the present disclosure, the absolute values of the torque current command value and the exciting current command value calculated by the power conversion controller during the power generation by the power generator have a positive correlation. This configuration enables improving the efficiency of the power generator.

DESCRIPTION OF EMBODIMENTS

A power conversion device and a drive control apparatus according to embodiments of the present disclosure are described below in detail with reference to the drawings. In the figures, the same or equivalent components are given the same reference signs.

Embodiment 1

Figure 1:
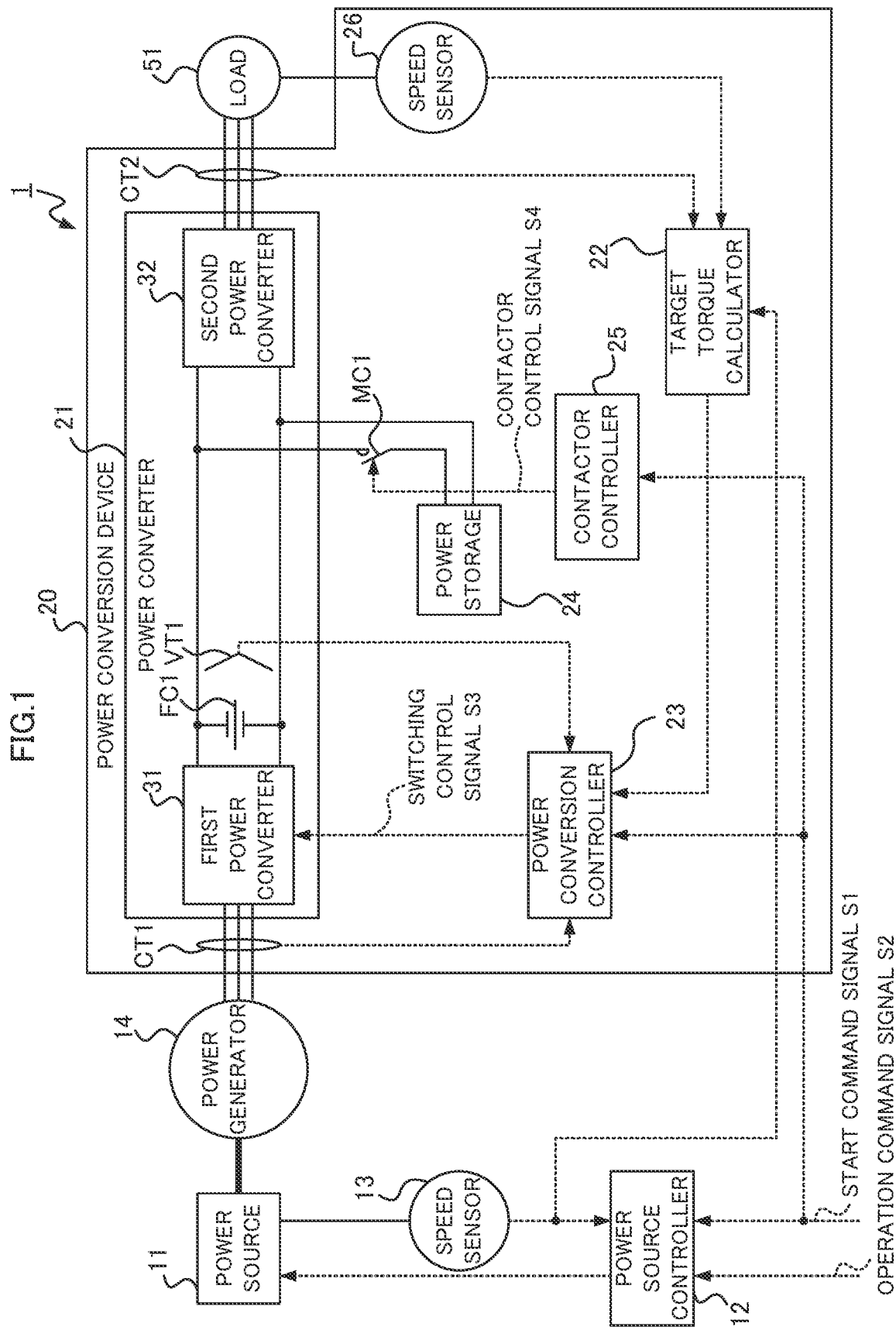
FIG. 1 is a block diagram of a drive control apparatus according to Embodiment 1.

A drive control apparatus 1 according to Embodiment 1 is described using a drive control apparatus mounted on a railway vehicle to drive the railway vehicle. As illustrated in FIG. 1, the drive control apparatus 1 includes a power source 11, a power source controller 12 that controls the power source 11, and a speed sensor 13 that detects the rotational speed of the power source 11. The drive control apparatus 1 further includes a power generator 14 that is driven in an excitation state by the power source 11 to generate power, and a power conversion device 20 that converts the power generated by the power generator 14 into power to be supplied to a load 51 and supplies the power resulting from the conversion to the load 51. The load 51 is, for example, a three-phase induction motor that is driven by the power output from the power conversion device 20 to produce the driving force of the railway vehicle. In FIG. 1, dotted-line arrows indicate various signals.

The power conversion device 20 includes a power converter 21 that converts the power generated by the power generator 14 into the power to be supplied to the load 51, and a target torque calculator 22 that calculates a target torque of the power generator 14 in accordance with the operation state of the load 51. The power conversion device 20 further includes a power conversion controller 23 that calculates a torque current command value and an exciting current command value for causing an output torque of the power generator 14 to approach the target torque, and controls the power converter 21 based on the calculated torque current command value and the calculated exciting current command value. The power conversion controller 23 controls the power converter 21, by vector control based on the torque current command value and the exciting current command value, to control the output torque of the power generator 14.

The absolute values of the torque current command value and the exciting current command value calculated by the power conversion controller 23 during power generation by the power generator 14 have a positive correlation. Thus, the absolute values of the torque current and the exciting current of the power generator 14 vary together in accordance with the operation state of the load 51. For example, when the load of the power generator 14 decreases due to a decrease in the power consumption of the load 51, the current effective value of the power generator 14 decreases, and thus the efficiency of the power generator 14 is improved.

The power conversion device 20 preferably further includes a power storage 24 that supplies power for excitation of the power generator 14 to the power converter 21 while the power generator 14 is not generating power, a contactor MC1 that electrically connects the power storage 24 to the power converter 21 or electrically disconnects the power storage 24 from the power converter 21, and a contactor controller 25 that controls the contactor MC1.

The power conversion device 20 further includes a current measurer CT1 that measures the value of each of U-phase current, V-phase current, and W-phase current flowing in a circuit between the power generator 14 and the power converter 21, a current measurer CT2 that measures the value of each of U-phase current, V-phase current, and W-phase current flowing to the load 51 from the power converter 21, a voltage measurer VT1 that measures the value of voltage between terminals of a filter capacitor FC1 that is included in the power converter 21 and is described later, and a speed sensor 26 that measures the rotational speed of the load 51.

The components of the drive control apparatus 1 are described in detail below.

The power source 11 generates motive power. Examples of the power source 11 include internal-combustion engines such as a diesel engine and a gasoline engine. In Embodiment 1, the power source 11 is an internal-combustion engine including a self-starting motor. An output shaft of the power source 11 is connected to an input shaft of the power generator 14. This structure transmits the rotation of the output shaft of the power source 11 to the power generator 14.

The power source controller 12 receives a start command signal S1 from a start switch on a non-illustrated driver cab, and receives an operation command signal S2 from a master controller on the driver cab. The start command signal S1 indicates the start of the power source 11. The start command signal S1 is set to a low (L) level to stop the power source 11. The start command signal S1 is set to a high (H) level to start the power source 11. The operation command signal S2 includes a power notch indicating the acceleration of the railway vehicle, a brake notch indicating the deceleration of the railway vehicle, or the like.

When the start command signal S1 is at the H level, the power source controller 12 starts the power source 11. More specifically, when the start command signal S1 is at the H level, the power source controller 12 transmits a control signal to the self-starting motor to start the self-starting motor. In response to the rotational force of the self-starting motor being transmitted to the power source 11, the power source 11 is started.

After the power source 11 is started, the power source controller 12 controls, based on a target rotational speed corresponding to the power notch, the brake notch, or the like indicated by the operation command signal S2, the power source 11 to cause the actual rotational speed of the power source 11 acquired from the speed sensor 13 to approach the target rotational speed. The power source controller 12 holds in advance, for each power notch, each brake notch, and the like, a corresponding value of the target rotational speed.

The speed sensor 13 includes a pulse generator (PG) mounted on the power source 11. In response to a pulse signal output from the PG, the speed sensor 13 calculates the rotational speed of the power source 11 and outputs a signal indicating the rotational speed of the power source 11. More specifically, the speed sensor 13 counts the rising edges of the pulse signal at every measurement time period, and calculates the rotational speed of the power source 11 based on the counted number of rising edges within the measurement time period.

The power generator 14 is an induction generator. The input shaft of the power generator 14 is joined to the output shaft of the power source 11. Upon being driven by the power source 11 in an excitation state of receiving supply of exciting power from the power conversion device 20, the power generator 14 generates AC power and outputs the generated AC power to the power conversion device 20.

The components of the power conversion device 20 that receives power from the power generator 14 are described in detail below.

The power converter 21 includes a first power converter 31 that converts the AC power supplied from the power generator 14 through primary terminals into DC power, the filter capacitor FC1 connected between secondary terminals of the first power converter 31, and a second power converter 32 that converts the DC power supplied from the first power converter 31 through the filter capacitor FC1 into three-phase AC power to be supplied to the load 51, and supplies the three-phase AC power to the load 51.

The first power converter 31 includes multiple switching elements and is a converter for bidirectional power conversion. The switching elements in the first power converter 31 are, for example, insulated-gate bipolar transistors (IGBTs). The switching elements are switched on or off based on switching control signals S3 transmitted from the power conversion controller 23. Thus, the first power converter 31 converts the AC power supplied from the power generator 14 into DC power or converts the DC power supplied from the filter capacitor FC1 into AC power.

The filter capacitor FC1 is charged with power supplied from the first power converter 31 or power supplied from the power storage 24.

The second power converter 32 converts the DC power supplied from the first power converter 31 through the filter capacitor FC1 into three-phase AC power, and supplies the three-phase AC power to the load 51. For example, the second power converter 32 is a variable frequency inverter including the switching elements. The second power converter 32 is controlled by a non-illustrated inverter controller.

The target torque calculator 22 calculates the target torque of the power generator 14 in accordance with the operation state of the load 51. In Embodiment 1, the target torque calculator 22 uses the output power of the power converter 21, or more specifically, the output power of the second power converter 32 as a value representing the operation state of the load 51. In particular, the target torque calculator 22 calculates the torque of the three-phase induction motor that is the load 51 based on measured values of phase current acquired from the current measurer CT2. The target torque calculator 22 multiplies the calculated torque of the three-phase induction motor by the rotational speed of the load 51 acquired from the speed sensor 26 to calculate the output power of the second power converter 32. The target torque calculator 22 divides the calculated output power of the second power converter 32 by the rotational speed of the power source 11 acquired from the speed sensor 13 to calculate the target torque of the power generator 14.

The start command signal S1 is supplied to the power conversion controller 23. The power conversion controller 23 acquires from the current measurer CT1 the value of each of the U-phase current, the V-phase current, and the W-phase current flowing between the power generator 14 and the power converter 21. The power conversion controller 23 acquires the voltage between the terminals of the filter capacitor FC1 from the voltage measurer VT1. The power conversion controller 23 acquires the target torque of the power generator 14 from the target torque calculator 22.

The power conversion controller 23 outputs the switching control signals S3 that controls the timing of turning on or off the switching elements in the first power converter 31, and controls the first power converter 31. More specifically, the power conversion controller 23 allows the first power converter 31 to operate as a DC-AC converter that converts the DC power supplied from the filter capacitor FC1 charged with discharge power of the power storage 24 into AC power or an AC-DC converter that converts the AC power supplied from the power generator 14 into DC power.

More specifically, the power conversion controller 23 calculates an exciting current command value for initial excitation during initial excitation of the power generator 14. During the initial excitation, the torque current command value is set to zero. The power conversion controller 23 controls the first power converter 31 based on the exciting current command value for initial excitation. Thus, the first power converter 31 converts the DC power supplied from the filter capacitor FC1 charged with discharge power of the power storage 24 into AC power, and supplies the AC power to the power generator 14. This causes the initial excitation of the power generator 14, and the power generator 14 starts to generate power.

The power conversion controller 23 calculates the torque current command value and the exciting current command value for causing the output torque of the power generator 14 to approach the target torque calculated by the target torque calculator 22 during power generation by the power generator 14. The power conversion controller 23 controls the first power converter 31 based on the calculated torque current command value and the calculated exciting current command value. As described above, the power conversion controller 23 controls the first power converter 31, by vector control based on the torque current command value and the exciting current command value, to control the output torque of the power generator 14.

The absolute values of the torque current command value and the exciting current command value calculated by the power conversion controller 23 during power generation by the power generator 14 have a positive correlation. In other words, as the absolute value of the torque current command value decreases, the absolute value of the exciting current command value decreases. As the absolute value of the torque current command value increases, the absolute value of the exciting current command value increases. The absolute value of the exciting current command value is preferably greater than or equal to the absolute value of the torque current command value.

The absolute values of the torque current command value and the exciting current command value calculated by the power conversion controller 23 during power generation by the power generator 14 are preferably expected to be equal to each other. More specifically, the power conversion controller 23 calculates the torque current command value for causing the output torque of the power generator 14 to approach the target torque calculated by the target torque calculator 22, and calculates the exciting current command value with the absolute value expected to be equal to the absolute value of the torque current command value.

The power storage 24 includes a rechargeable battery and is connected to the filter capacitor FC1 in parallel. When the filter capacitor FC1 is charged with power discharged by the power storage 24, the initial excitation of the power generator 14 can be performed.

The contactor MC1 is located between the power storage 24 and the first power converter 31. More specifically, one end of the contactor MC1 is connected to a terminal of the power storage 24 and the other end of the contactor MC1 is connected to one connection point of connection points between the secondary terminals of the first power converter 31 and the primary terminals of the second power converter 32. For example, the contactor MC1 is a direct current electromagnetic contactor.

The contactor controller 25 controls the contactor MC1. More specifically, the contactor controller 25 transmits, to the contactor MC1, a contactor control signal S4 that turns on or off the contactor MC1. When the contactor controller 25 turns on the contactor MC1, both the ends of the contactor MC1 are electrically connected, and the power storage 24 is electrically connected to the power converter 21. When the contactor controller 25 turns off the contactor MC1, both the ends of the contactor MC1 are insulated, and the power storage 24 is electrically disconnected from the power converter 21.

The speed sensor 26 includes a PG mounted on the load 51. Based on a pulse signal output from the PG mounted on the load 51, the speed sensor 26 calculates the rotational speed of the load 51 and outputs a signal indicating the rotational speed of the load 51. More specifically, the speed sensor 26 counts the rising edges of the pulse signal at every measurement time period, and calculates the rotational speed of the load 51 based on the counted number of rising edges within the measurement time period.

Figure 2:
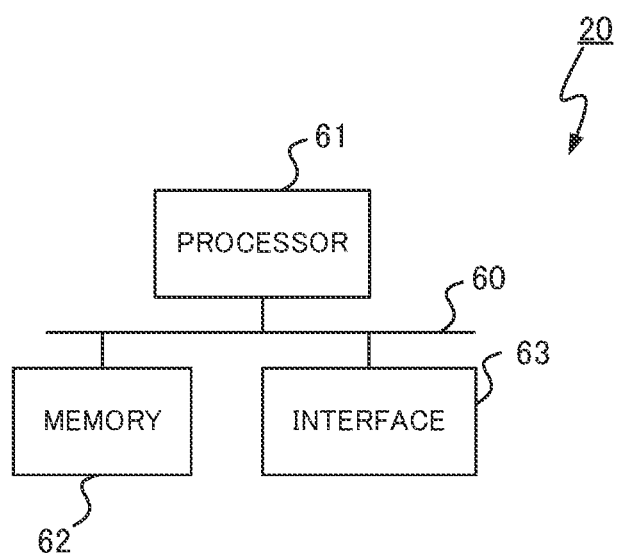
FIG. 2 is a diagram of a power conversion device according to Embodiment 1, illustrating the hardware configuration.

The control components of the power conversion device 20 with the above structure, or more specifically, the target torque calculator 22, the power conversion controller 23, and the contactor controller 25 are implemented by a processor 61, a memory 62, and an interface 63 as illustrated in FIG. 2. A bus 60 connects the processor 61, the memory 62, and the interface 63 to one another. The bus 60 and the interface 63 connect the processor 61 to a sensor group inside and outside the power conversion device 20, or more specifically, to each of the current measurers CT1 and CT2, the voltage measurer VT1, and the speed sensors 13 and 26. The processor 61 executes a program stored in the memory 62 to perform computation in each of the target torque calculator 22, the power conversion controller 23, and the contactor controller 25.

The interface 63 connects the control components of the power conversion device 20 to the sensor group inside and outside the power conversion device 20. The interface 63 establishes communication and complies with multiple types of interface standards, as appropriate. FIG. 2 illustrates the control components of the power conversion device 20 including a single processor 61 and a single memory 62. The control components of the power conversion device 20 may include multiple processors 61 and multiple memories 62.

The operation of the drive control apparatus 1 with the above structure is described with reference to timing charts of (A) to (F) of FIG. 3 as an example in which the power source 11 starts at a time T1.

Figure 3:
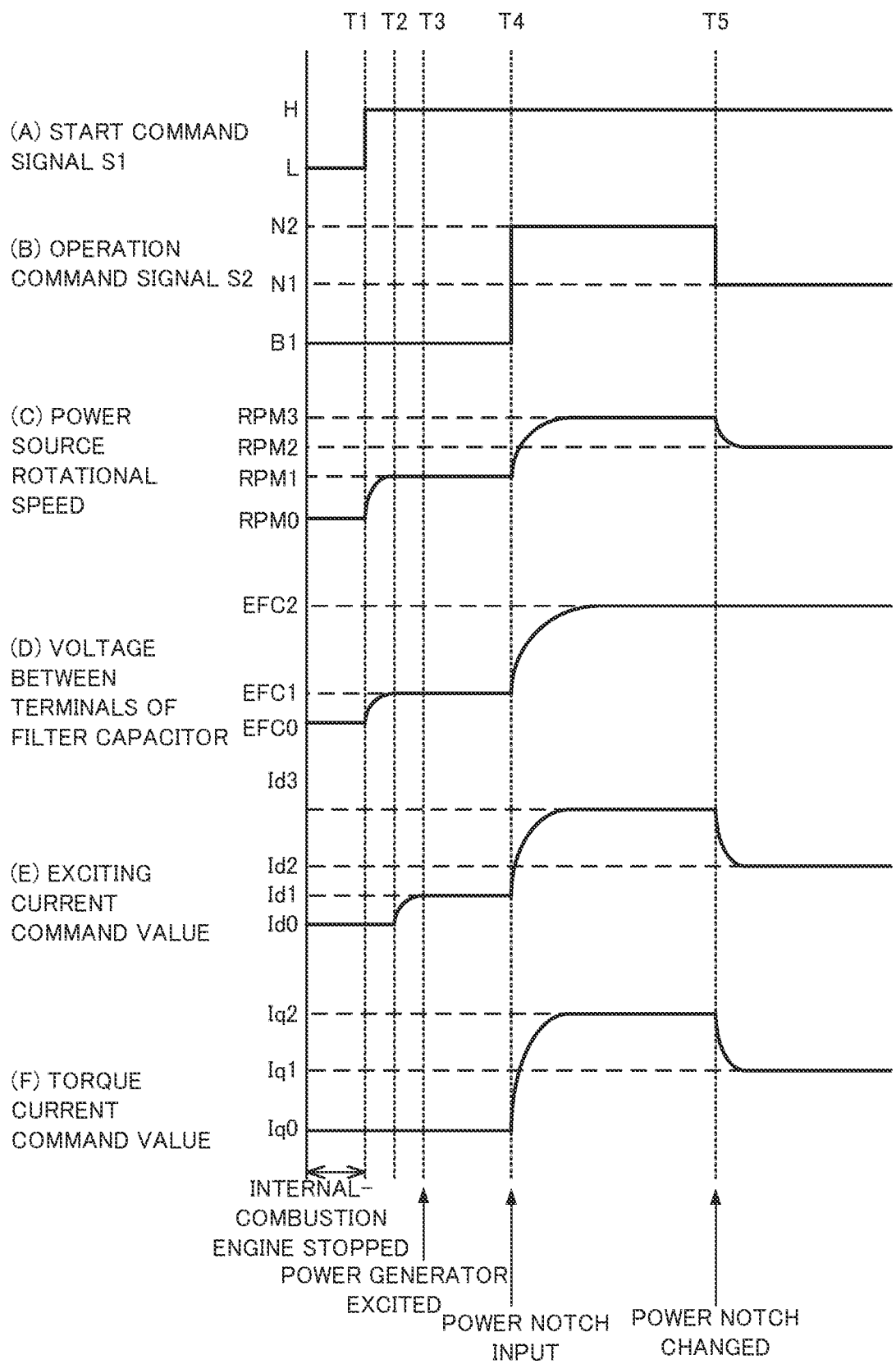
FIG. 3 illustrates timing charts of an operation of the drive control apparatus according to Embodiment 1; (A) is a timing chart of a start command signal; (B) is a timing chart of an operation command signal; (C) is a timing chart of a power source rotational speed; (D) is a timing chart of a voltage between terminals of a filter capacitor; (E) is a timing chart of an exciting current command value; and (F) is a timing chart of a torque current command value.

Until the time T1, or in other words, while the power source 11 is being stopped, the start command signal S1 is at the L level and the operation command signal S2 indicates a brake notch B1, as illustrated in (A) and (B) of FIG. 3. As illustrated in (C) of FIG. 3, the power source 11 being stopped has a rotational speed RPM0. The filter capacitor FC1 with the power source 11 being stopped is discharged, and the filter capacitor FC1 in the discharged state has a voltage EFC0 between the terminals as illustrated in (D) of FIG. 3.

With the power source 11 being stopped, the power generator 14 stops. As illustrated in (E) of FIG. 3 illustrating the absolute value of the exciting current command value, the exciting current command value during stop of the power generator 14 has an absolute value Id0. As illustrated in (F) of FIG. 3 illustrating the absolute value of the torque current command value, the torque current command value during stop of the power generator 14 has an absolute value Iq0.

As illustrated in (A) of FIG. 3, when the start command signal S1 changes from the L level to the H level at the time T1, the power source controller 12 starts the power source 11. As illustrated in (C) of FIG. 3, the rotational speed of the power source 11 starts to increase from the rotational speed RPM0. The rotational speed of the power source 11 then reaches a rotational speed RPM1. The rotational speed RPM1 is the rotational speed of the power source 11 when the power source 11 starts and the operation command signal S2 indicates the brake notch B1.

When the start command signal S1 changes from the L level to the H level, the contactor controller 25 turns on the contactor MC1. Thus, the voltage between the terminals of the filter capacitor FC1 starts to increase from the voltage EFC0 at the time T1, as illustrated in (D) of FIG. 3. When the voltage between the terminals of the filter capacitor FC1 reaches a voltage EFC1 at a time T2, the power conversion device 20 can perform the initial excitation of the power generator 14. The voltage EFC1 is the voltage between the terminals of the filter capacitor FC1 when the filter capacitor FC1 is charged to a level at which the initial excitation of the power generator 14 is performable. The contactor controller 25 turns off the contactor MC1 at the time T2. Thus, the power storage 24 is electrically disconnected from the power converter 21.

The initial excitation of the power generator 14 performed by the power conversion device 20 is described with reference to FIG. 4. The power conversion controller 23 in the power conversion device 20 repeats the processing in step S11 when the start command signal S1 is not at the H level indicating the start of the power source 11 (No in step S11). The power conversion controller 23 acquires the voltage between the terminals of the filter capacitor FC1 when the start command signal S1 is at the H level indicating the start of the power source 11 (Yes in step S11), or more specifically, after the time T1 in FIG. 3, and determines whether the voltage between the terminals of the filter capacitor FC1 is greater than or equal to the voltage EFC1.

Figure 4:
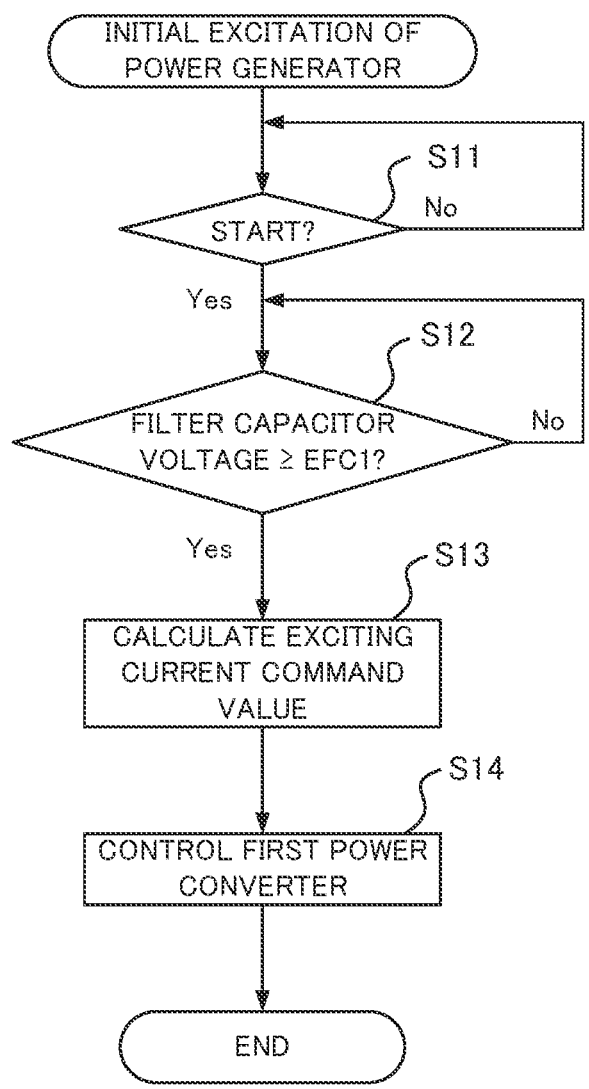
FIG. 4 is a flowchart of an operation of initial excitation of a power generator performed by the power conversion device according to Embodiment 1.

The power conversion controller 23 repeats the processing in step S12 when the voltage between the terminals of the filter capacitor FC1 does not reach the voltage EFC1 (No in step S12) as illustrated in FIG. 4, or more specifically, between the time T1 and the time T2 in FIG. 3. The power conversion controller 23 calculates the exciting current command value for initial excitation (step S13) when the voltage between the terminals of the filter capacitor FC1 is greater than or equal to the voltage EFC1 (Yes in step S12) as illustrated in FIG. 4. The power conversion controller 23 controls the first power converter 31 based on the exciting current command value for initial excitation (step S14). When the processing in step S14 is ended, the power conversion device 20 ends the initial excitation of the power generator 14.

As described above, the absolute value of the exciting current command value gradually increases from the time T2 as illustrated in (E) of FIG. 3 when the power conversion controller 23 performs the initial excitation of the power generator 14. The absolute value of the exciting current command value then reaches an absolute value Id1 at a time T3. When the absolute value of the exciting current command value reaches the absolute value Id1, the initial excitation of the power generator 14 is complete, and the power generator 14 starts to generate power.

Subsequently, the master controller inputs a power notch N2, and the operation command signal S2 indicates the power notch N2. This time is defined as a time T4. After the time T4, the power source controller 12 controls the power source 11 to cause the rotational speed of the power source 11 to approach a rotational speed RPM3 corresponding to the power notch N2. With an increase in the rotational speed of the power source 11, the rotational speed of the power generator 14 increases, and the output torque of the power generator 14 also increases.

When the power notch N2 is input at the time T4, the inverter controller starts to control the second power converter 32. Thus, the second power converter 32 converts the DC power that is generated by the power generator 14, converted by the first power converter 31, and supplied from the primary terminals through the filter capacitor FC1 into power to be supplied to the load 51, and supplies the power resulting from the conversion to the load 51. In other words, the output power of the second power converter 32 increases after the time T4.

The power conversion device 20 controls the power generator 14 in accordance with the target torque calculated based on the operation state of the load 51, or more specifically, the output power of the second power converter 32. The control of the power generator 14 by the power conversion device 20 is described with reference to FIG. 5. For example, when the initial excitation of the power generator 14 is complete, the power conversion device 20 starts the control in FIG. 5.

The target torque calculator 22 calculates the torque of the three-phase induction motor that is the load 51 based on the measured values of phase current acquired from the current measurer CT2. The target torque calculator 22 multiplies the calculated torque of the three-phase induction motor by the rotational speed of the load 51 acquired from the speed sensor 26 to calculate the output power of the second power converter 32 (step S21).

The target torque calculator 22 then divides the output power of the second power converter 32 calculated in step S21 by the rotational speed of the power source 11 acquired from the speed sensor 13 to calculate the target torque of the power generator 14 (step S22).

The power conversion controller 23 calculates the torque current command value and the exciting current command value for causing the output torque of the power generator 14 to approach the target torque calculated in step S22 (step S23). The power conversion controller 23 controls the first power converter 31 by vector control based on the torque current command value and the exciting current command value calculated in step S23 (step S24). When the processing in step S24 is complete, the components of the power conversion device 20 repeat the above processing from step S21.

When the master controller inputs the power notch N2 at the time T4 in FIG. 3, the output power of the second power converter 32 increases as described above. Through the control of the power generator 14 by the power conversion device 20 in FIG. 5, the absolute value of the torque current command value increases as illustrated in (F) of FIG. 3. More specifically, the absolute value of the torque current command value increases from the absolute value Iq0 to an absolute value Iq2. The absolute values of the torque current command value and the exciting current command value have a positive correlation, and thus the absolute value of the exciting current command value also increases as illustrated in (E) of FIG. 3. More specifically, the absolute value of the exciting current command value increases from the absolute value Id1 to an absolute value Id3. The absolute value Id3 preferably matches the absolute value Iq2.

Subsequently, when the master controller inputs a power notch N1, the operation command signal S2 indicates the power notch N1. This time is defined as a time T5. An acceleration indicated by the power notch N1 is lower than an acceleration indicated by the power notch N2.

After the time T5, the power source controller 12 controls the power source 11 to cause the rotational speed of the power source 11 to approach a rotational speed RPM2 corresponding to the power notch N1. The output power of the second power converter 32 when the operation command signal S2 indicates the power notch N1 is lower than the output power of the second power converter 32 when the operation command signal S2 indicates the power notch N2. In other words, the output power of the second power converter 32 decreases after the time T5.

Figure 5:
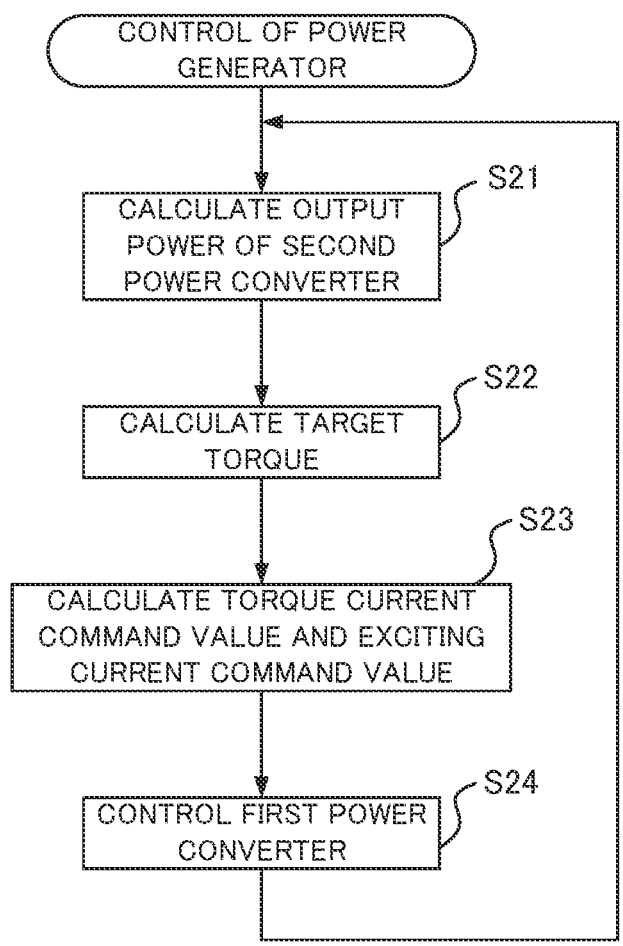
FIG. 5 is a flowchart of an operation of control of the power generator performed by the power conversion device according to Embodiment 1.

The power conversion device 20 repeats the control of the power generator 14 in FIG. 5 after the time T5. The target torque calculated by the target torque calculator 22 when the operation command signal S2 indicates the power notch N1 is lower than the target torque calculated by the target torque calculator 22 when the operation command signal S2 indicates the power notch N2. Thus, the absolute value of the torque current command value decreases after the time T5 as illustrated in (F) of FIG. 3. More specifically, the absolute value of the torque current command value decreases from the absolute value Iq2 to the absolute value Iq1. The absolute values of the torque current command value and the exciting current command value have a positive correlation, and thus the absolute value of the exciting current command value also decreases after the time T5 as illustrated in (E) of FIG. 3. More specifically, the absolute value of the exciting current command value decreases from the absolute value Id3 to an absolute value Id2.

As described above, the absolute values of the torque current command value and the exciting current command value vary together in accordance with the operation state of the load 51 during power generation by the power generator 14, or more specifically, after the time T3 in FIG. 3.

The power conversion device 20 according to Embodiment 1 calculates the target torque of the power generator 14 in accordance with the operation state of the load 51 during power generation by the power generator 14, and calculates the torque current command value and the exciting current command value in accordance with the target torque as described above. The power conversion device 20 performs vector control based on the calculated torque current command value and the calculated exciting current command value, and controls the output torque of the power generator 14.

The absolute values of the torque current command value and the exciting current command value calculated during power generation by the power generator 14 have a positive correlation. Thus, the absolute values of the torque current command value and the exciting current command value vary together in accordance with the operation state of the load 51, or more specifically, the output power of the second power converter 32. Thus, the efficiency of the power generator 14 is higher than when vector control is performed with the exciting current command value maintained constantly. For example, when the power consumption at the load 51 decreases, in other words, when the load of the power generator 14 decreases, the absolute values of the torque current command value and the exciting current command value decrease. Thus, the decrease in the current effective value of the power generator 14 improves the efficiency of the power generator 14.

When the power conversion device 20 calculates the torque current command value in accordance with the target torque and calculates the exciting current command value with the absolute value expected to be equal to the absolute value of the torque current command value, a reactive current decreases, and thus the efficiency of the power generator 14 is improved.

Embodiment 2

The drive control apparatus may supply power to multiple loads. A drive control apparatus 2 that supplies power to loads 51 and 52 according to Embodiment 2 is described.

Figure 6:
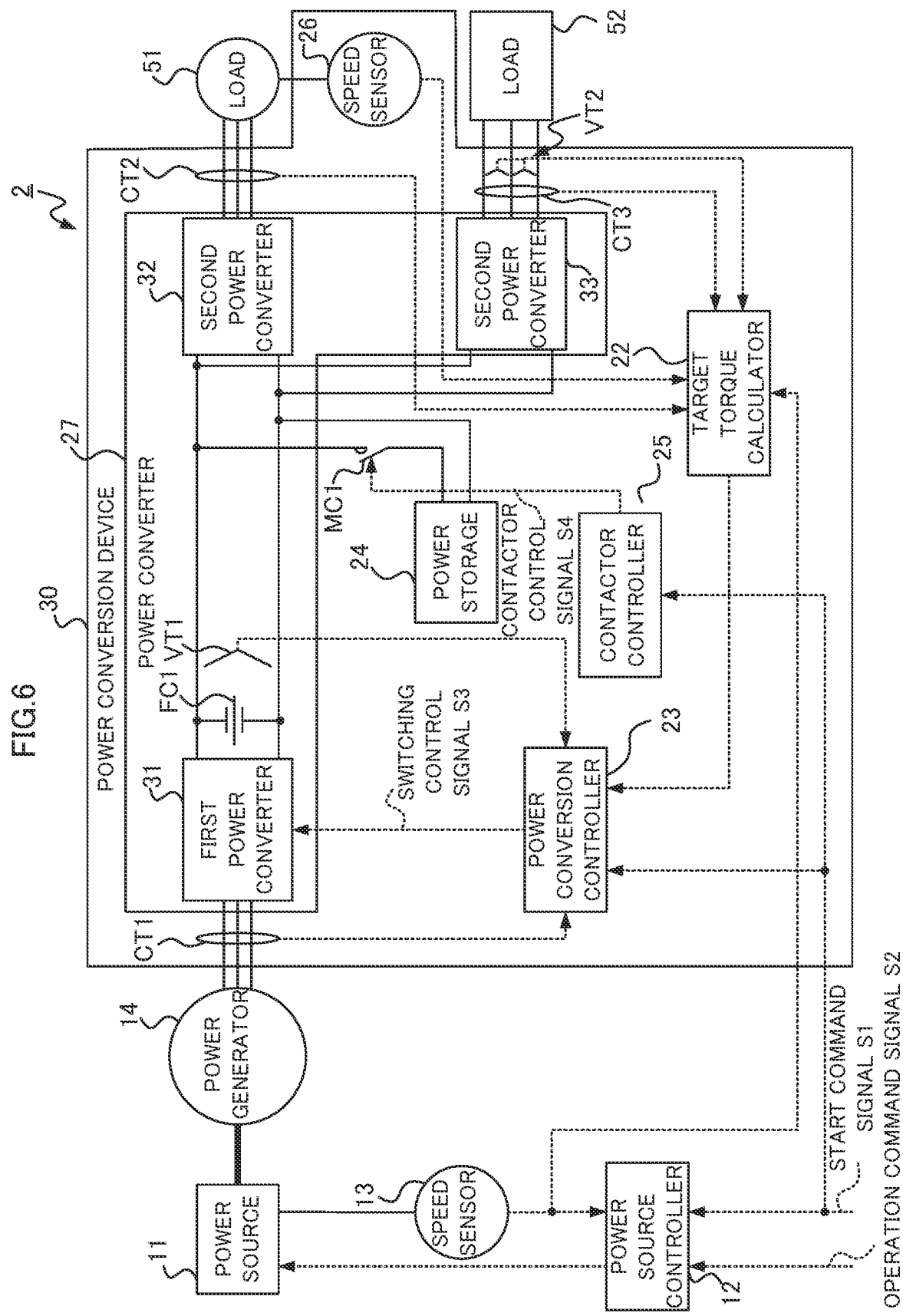
FIG. 6 is a block diagram of a drive control apparatus according to Embodiment 2.

The drive control apparatus 2 illustrated in FIG. 6 includes a power conversion device 30 that converts power generated by the power generator 14 into power to be supplied to the loads 51 and 52 and supplies the power resulting from the conversion to the loads 51 and 52. The load 52 is, for example, an in-vehicle apparatus such as an illuminator and an air-conditioner. In Embodiment 2, the load 52 operates under supply of three-phase AC power from the power conversion device 30.

The structure of the power conversion device 30 is described below focusing on the differences from the power conversion device 20 according to Embodiment 1.

The power conversion device 30 includes a power converter 27 that converts the power generated by the power generator 14 into the power to be supplied to the load 51. The power conversion device 30 further includes a current measurer CT3 that measures the value of each of U-phase current, V-phase current, and W-phase current flowing in a circuit between the power converter 27 and the load 52, and a voltage measurer VT2 that measures the line voltage of three-phase AC power supplied to the load 52 from the power converter 27.

In addition to the structure of the power converter 21 according to Embodiment 1, the power converter 27 includes a second power converter 33 that converts the DC power supplied from the first power converter 31 through the filter capacitor FC1 into three-phase AC power to be supplied to the load 52, and supplies the three-phase AC power to the load 52.

The second power converter 33 converts the DC power supplied from the first power converter 31 through the filter capacitor FC1 into three-phase AC power, and supplies the three-phase AC power to the load 52. For example, the second power converter 33 is a constant-voltage constant-frequency inverter including multiple switching elements. The second power converter 33 is controlled by anon-illustrated inverter controller.

The target torque calculator 22 calculates the torque of the load 51 based on the measured values of phase current acquired from the current measurer CT2, and multiplies the calculated torque of the load 51 by the rotational speed of the load 51 acquired from the speed sensor 26 to calculate the output power of the second power converter 32 in the same manner as in Embodiment 1. The target torque calculator 22 calculates each of a U-phase voltage, a V-phase voltage, and a W-phase voltage of the three-phase AC power output by the second power converter 33 based on the line voltage acquired from the voltage measurer VT2. The target torque calculator 22 then calculates the output power of the second power converter 33 based on the calculated U-phase voltage, the calculated V-phase voltage, and the calculated W-phase voltage as well as the U-phase current, the V-phase current, and the W-current phase acquired from the current measurer CT3.

The target torque calculator 22 adds the calculated output power of the second power converter 32 and the calculated output power of the second power converter 33, and divides the sum by the rotational speed of the power source 11 acquired from the speed sensor 13 to calculate the target torque of the power generator 14.

The control components of the power conversion device 30 with the above structure, or more specifically, the target torque calculator 22, the power conversion controller 23, and the contactor controller 25 are implemented by the same hardware configuration as in Embodiment 1.

The operation of the drive control apparatus 2 with the above structure is described with reference to timing charts of (A) to (F) of FIG. 7 as an example in which the power source starts at a time T11.

Figure 7:
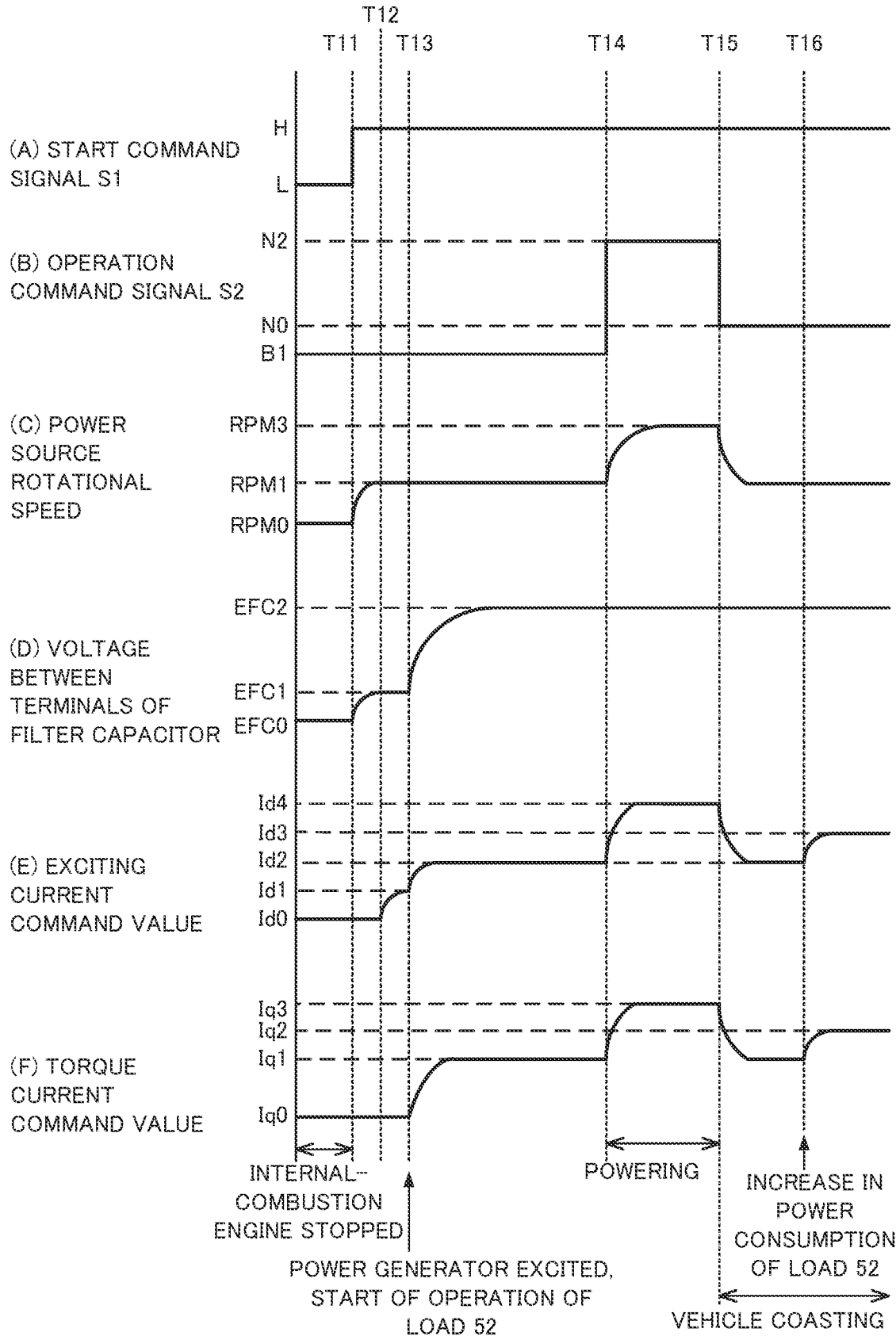
FIG. 7 illustrates timing charts of an operation of the drive control apparatus according to Embodiment 2; (A) is a timing chart of a start command signal; (B) is a timing chart of an operation command signal; (C) is a timing chart of a power source rotational speed; (D) is a timing chart of a voltage between terminals of a filter capacitor; (E) is a timing chart of an exciting current command value; and (F) is a timing chart of a torque current command value.

Similarly to Embodiment 1, until the time T11, in other words, while the power source 11 is being stopped, the start command signal S1 is at the L level and the operation command signal S2 indicates the brake notch B1, as illustrated in (A) and (B) of FIG. 7. As illustrated in (C) of FIG. 7, the power source 11 being stopped has a rotational speed RPM0. The filter capacitor FC1 with the power source 11 being stopped is discharged, and the filter capacitor FC1 in the discharged state has a voltage EFC0 between the terminals as illustrated in (D) of FIG. 7.

With the power source 11 being stopped, the power generator 14 stops. As illustrated in (E) of FIG. 7 illustrating the absolute value of the exciting current command value, the exciting current command value during stop of the power generator 14 has an absolute value Id0. As illustrated in (F) of FIG. 7 illustrating the absolute value of the torque current command value, the torque current command value during stop of the power generator 14 has an absolute value Iq0.

As illustrated in (A) of FIG. 7, when the start command signal S1 changes from the L level to the H level at the time T11, the power source controller 12 starts the power source 11, as in Embodiment 1. As illustrated in (C) of FIG. 7, the rotational speed of the power source 11 starts to increase from the rotational speed RPM0 at the time T11. The rotational speed of the power source 11 then reaches a rotational speed RPM1. The rotational speed RPM1 is the rotational speed of the power source 11 when the power source 11 starts and the operation command signal S2 indicates the brake notch B1.

When the start command signal S1 changes from the L level to the H level, the contactor controller 25 turns on the contactor MC1. Thus, the voltage across the filter capacitor FC1 starts to increase from the voltage EFC0 at the time T11, as illustrated in (D) of FIG. 7. When the voltage across the filter capacitor FC1 reaches a voltage EFC1 at a time T12, the power conversion device 30 can perform the initial excitation of the power generator 14. The contactor controller 25 turns off the contactor MC1 at the time T12. Thus, the power storage 24 is electrically disconnected from the power converter 27.

The power conversion device 30 performs the initial excitation of the power generator 14 similarly to the power conversion device 20 according to Embodiment 1. The absolute value of the exciting current command value gradually increases from the time T12 as illustrated in (E) of FIG. 7 when the power conversion controller 23 in the power conversion device 30 performs the initial excitation of the power generator 14. The absolute value of the exciting current command value then reaches an absolute value Id1 at a time T13. When the absolute value of the exciting current command value reaches the absolute value Id1, the initial excitation of the power generator 14 is complete, and the power generator 14 starts to generate power.

The inverter controller starts to control the second power converter 33 at the time T13 and supplies power to the load 52, and the load 52 starts to operate. Thus, the output power of the second power converter 33 increases.

Figure 8:
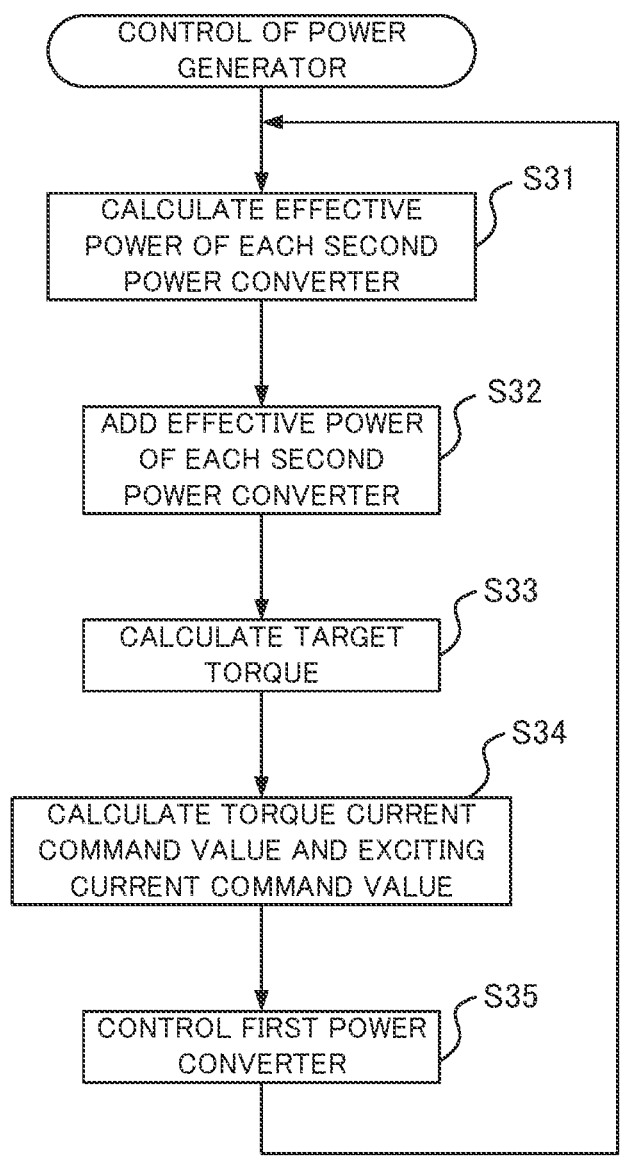
FIG. 8 is a flowchart of an operation of control of the power generator performed by a power conversion device according to Embodiment 2.

The power conversion device 30 controls the power generator 14 in accordance with the target torque calculated based on the operation state of the load 51, or more specifically, the sum of the output power of the second power converters 32 and 33. The control of the power generator 14 performed by the power conversion device 30 is described with reference to FIG. 8. For example, when the initial excitation of the power generator 14 is complete, the power conversion device 30 starts the control as illustrated in FIG. 8.

The target torque calculator 22 calculates the output power of the second power converter 32 based on the measured values of phase current acquired from the current measurer CT2 and the rotational speed of the load 51 acquired from the speed sensor 26, and calculates the output power of the second power converter 33 based on the line voltage acquired from the voltage measurer VT2 and the phase current acquired from the current measurer CT3 (step S31).

The target torque calculator 22 adds the output power of the second power converters 32 and 33 calculated in step S31 (step S32).

The target torque calculator 22 calculates the target torque of the power generator 14 based on the sum of the output power of the second power converters 32 and 33 calculated in step S32 (step S33).

The power conversion controller 23 calculates the torque current command value and the exciting current command value for causing the output torque of the power generator 14 to approach the target torque calculated in step S33 (step S34). The power conversion controller 23 controls the first power converter 31 by vector control based on the torque current command value and the exciting current command value calculated in step S34 (step S35). When the processing in step S35 is complete, the components of the power conversion device 30 repeat the above processing from step S31.

When the load 52 starts to operate at the time T13 in FIG. 7 as described above, the output power of the second power converter 33 increases. As a result of the control process for the power generator 14 performed by the power conversion device 30 as illustrated in FIG. 8, the absolute value of the torque current command value increases as illustrated in (F) of FIG. 7. More specifically, the absolute value of the torque current command value increases from the absolute value Iq0 to the absolute value Iq1. The absolute values of the torque current command value and the exciting current command value have a positive correlation, and thus the absolute value of the exciting current command value also increases as illustrated in (E) of FIG. 7. More specifically, the absolute value of the exciting current command value increases from the absolute value Id1 to an absolute value Id2. The absolute value Id2 preferably matches the absolute value Iq2.

Subsequently, when the master controller inputs a power notch N2, the operation command signal S2 indicates the power notch N2. This time is defined as a time T14. After the time T14, the power source controller 12 controls the power source 11 to cause the rotational speed of the power source 11 to approach a rotational speed RPM3 corresponding to the power notch N2. With an increase in the rotational speed of the power source 11, the rotational speed of the power generator 14 increases, and the output torque of the power generator 14 also increases.

When the power notch N2 is input at the time T14, the inverter controller starts to control the second power converter 32. Thus, the second power converter 32 converts the DC power that is generated by the power generator 14, converted by the first power converter 31, and supplied from the primary terminals through the filter capacitor FC1 into power to be supplied to the load 51, and supplies the power resulting from the conversion to the load 51. In other words, the output power of the second power converter 32 increases after the time T14.

The power conversion device 30 performs the control of the power generator 14 in FIG. 8 after the time T14. The target torque calculated by the target torque calculator 22 when the load 52 operates and the operation command signal S2 indicates the power notch N2 is higher than the target torque calculated by the target torque calculator 22 when the load 52 operates and the operation command signal S2 indicates the brake notch B1. Thus, the absolute value of the torque current command value increases after the time T14 as illustrated in (F) of FIG. 7. More specifically, the absolute value of the torque current command value increases from the absolute value Iq1 to an absolute value Iq3. The absolute values of the torque current command value and the exciting current command value have a positive correlation, and thus the absolute value of the exciting current command value also increases after the time T14 as illustrated in (E) of FIG. 7. More specifically, the absolute value of the exciting current command value increases from the absolute value Id2 to an absolute value Id4. The absolute value Id4 preferably matches the absolute value Iq3.

Subsequently, when the master controller does not input a power notch or a brake notch, the operation command signal S2 indicates a notch N0. The notch N0 means that a vehicle is coasting. This time is defined as a time T15. After the time T15, the rotational speed of the power source 11 is controlled to approach the rotational speed RPM1 corresponding to the notch N0. The rotational speed of the power source 11 corresponding to the notch N0 is the same as the rotational speed of the power source 11 corresponding to the brake notch B1. As the rotational speed of the power source 11 decreases, the rotational speed of the power generator 14 decreases, and the output torque of the power generator 14 also decreases.

The power conversion device 30 performs the control of the power generator 14 in FIG. 8 after the time T15. The target torque calculated by the target torque calculator 22 when the load 52 operates and the operation command signal S2 indicates the notch N0 is lower than the target torque calculated by the target torque calculator 22 when the load 52 operates and the operation command signal S2 indicates the power notch N2. Thus, the absolute value of the torque current command value decreases after the time T15 as illustrated in (F) of FIG. 7. More specifically, the absolute value of the torque current command value decreases from the absolute value Iq3 to the absolute value Iq1. The absolute values of the torque current command value and the exciting current command value have a positive correlation, and thus the absolute value of the exciting current command value also decreases after the time T15 as illustrated in (E) of FIG. 7. More specifically, the absolute value of the exciting current command value decreases from the absolute value Id4 to the absolute value Id2. The absolute value Id2 preferably matches the absolute value Iq1.

The power consumption of the load 52 then increases. This time is defined as a time T16. The power conversion device 30 performs the control of the power generator 14 in FIG. 8 after the time T16. When the power consumption of the load 52 increases while a railway vehicle is coasting, the target torque calculated by the target torque calculator 22 increases. Thus, the absolute value of the torque current command value increases after the time T16 as illustrated in (F) of FIG. 7. More specifically, the absolute value of the torque current command value increases from the absolute value Iq1 to the absolute value Iq2. The absolute values of the torque current command value and the exciting current command value have a positive correlation, and thus the absolute value of the exciting current command value also increases after the time T16 as illustrated in (E) of FIG. 7. More specifically, the absolute value of the exciting current command value increases from the absolute value Id2 to an absolute value Id3. The absolute value Id3 preferably matches the absolute value Iq2.

As described above, the absolute values of the torque current command value and the exciting current command value vary together in accordance with the operation states of the loads 51 and 52 during power generation by the power generator 14, or more specifically, after the time T13 in FIG. 7.

The power conversion device 30 according to Embodiment 2 calculates the target torque of the power generator 14 in accordance with the operation states of the loads 51 and 52 during power generation by the power generator 14, and calculates the torque current command value and the exciting current command value in accordance with the target torque, as described above. The power conversion device 30 performs vector control based on the calculated torque current command value and the calculated exciting current command value, and controls the power-generation torque of the power generator 14.

The absolute values of the torque current command value and the exciting current command value calculated during power generation by the power generator 14 have a positive correlation. Thus, the absolute values of the torque current command value and the exciting current command value vary together in accordance with the operation states of the loads 51 and 52, or more specifically, the sum of the output power of the second power converters 32 and 33. Thus, the efficiency of the power generator 14 is higher than when vector control is performed with the exciting current command value maintained constantly.

Embodiment 3

A method for calculating the target torque in accordance with the operation state of the load 51 is not limited to the above examples. The value representing the operation state of the load 51 may be the output power of the first power converter 31. A power conversion device 40 and a drive control apparatus 3 including the power conversion device 40 according to Embodiment 3 are described. The power conversion device 40 calculates the target torque in accordance with the output power of the first power converter 31 and performs vector control in accordance with the target torque.

Figure 9:
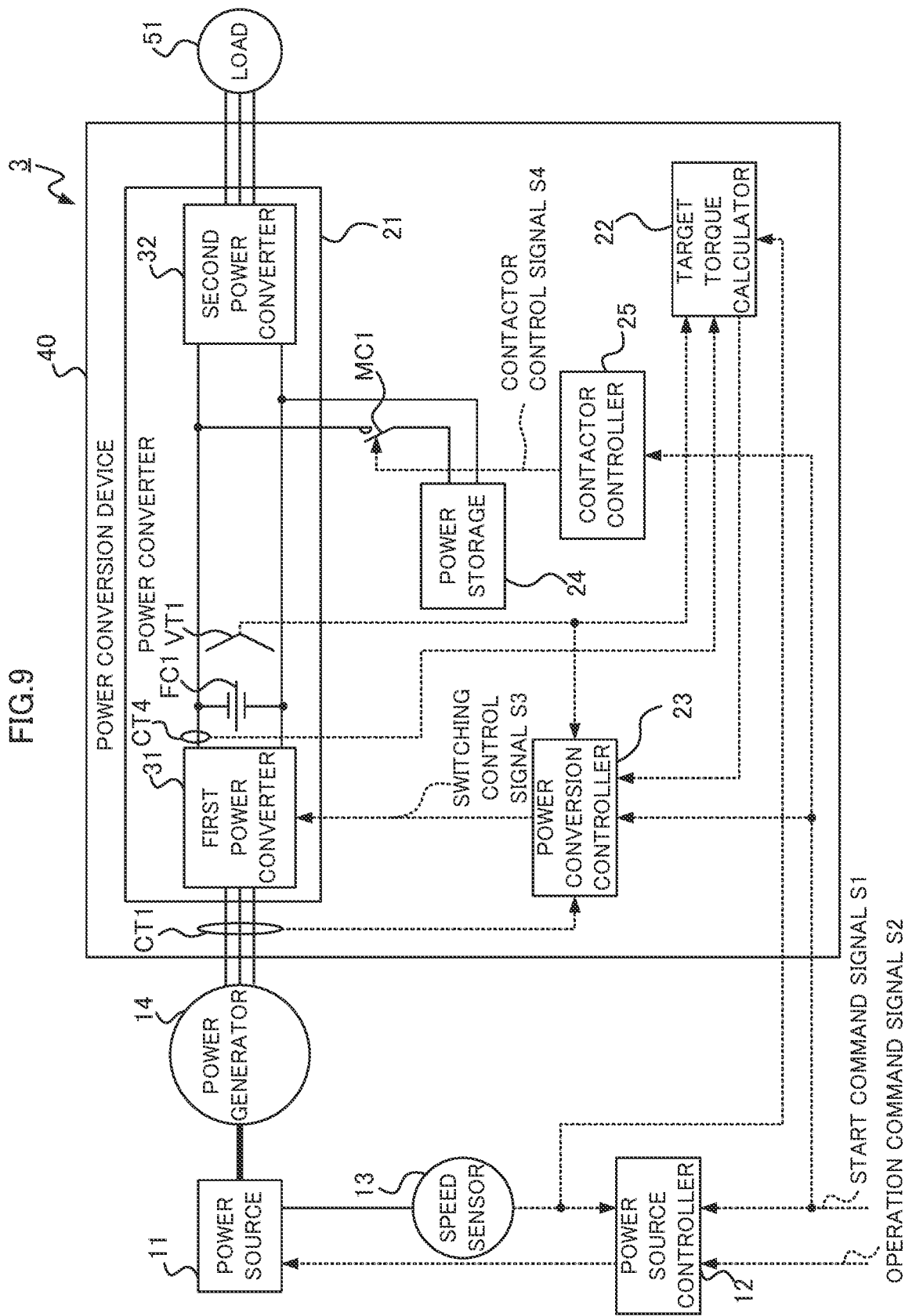
FIG. 9 is a block diagram of a drive control apparatus according to Embodiment 3.

The drive control apparatus 3 illustrated in FIG. 9 includes the power conversion device 40 that converts power generated by the power generator 14 into power to be supplied to the load 51 and supplies the power resulting from the conversion to the load 51.

The structure of the power conversion device 40 is described below focusing on the differences from the power conversion device 20 according to Embodiment 1.

The power conversion device 40 includes a current measurer CT4 that measures the output current of the first power converter 31.

The target torque calculator 22 calculates the output power of the first power converter 31 based on the measured values of current acquired from the current measurer CT4 and the voltage between the terminals of the filter capacitor FC1 acquired from the voltage measurer VT1. The target torque calculator 22 divides the calculated output power of the first power converter 31 by the rotational speed of the power source 11 acquired from the speed sensor 13 to calculate the target torque of the power generator 14.

The control components of the power conversion device 40 with the above structure, or more specifically, the target torque calculator 22, the power conversion controller 23, and the contactor controller 25 are implemented by the same hardware configuration as in Embodiment 1.

Figure 10:
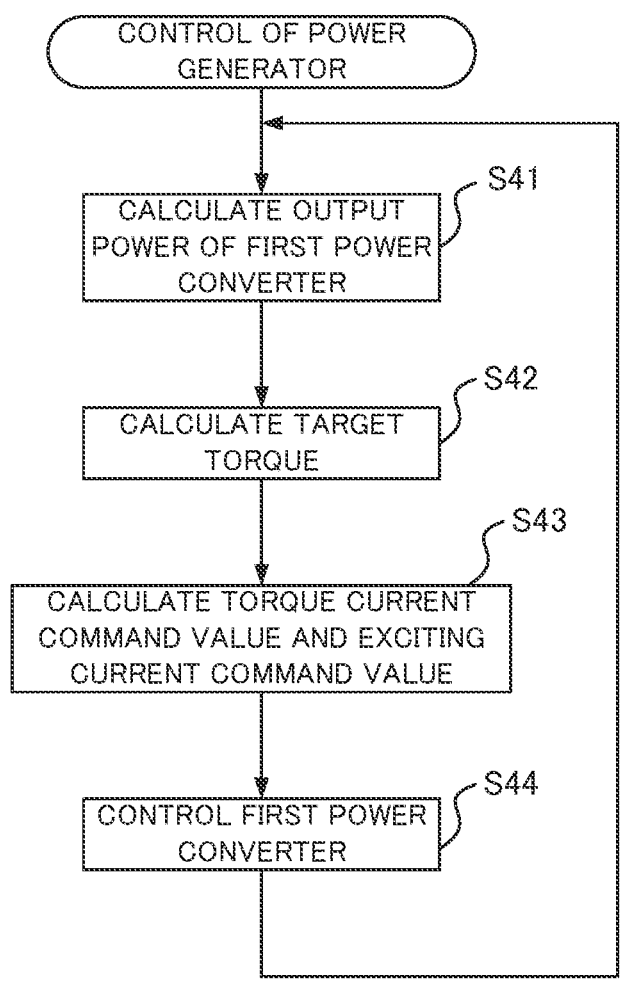
FIG. 10 is a flowchart of an operation of control of the power generator performed by a power conversion device according to Embodiment 3.

The operation of the drive control apparatus 3 including the power conversion device 40 with the above structure is the same as in Embodiment 1 except the method for calculating the target torque of the target torque calculator 22. The control of the power generator 14 performed by the power conversion device 40 after the initial excitation of the power generator 14 is complete is described with reference to FIG. 10.

The target torque calculator 22 calculates the output power of the first power converter 31 based on the output current of the first power converter 31 acquired from the current measurer CT4 and the voltage between the terminals of the filter capacitor FC1 acquired from the voltage measurer VT1 (step S41).

The target torque calculator 22 then divides the output power of the first power converter 31 calculated in step S41 by the rotational speed of the power source 11 acquired from the speed sensor 13 to calculate the target torque of the power generator 14 (step S42).

The power conversion controller 23 calculates the torque current command value and the exciting current command value for causing the output torque of the power generator 14 to approach the target torque calculated in step S42 in the same manner as Embodiment 1 (step S43). The power conversion controller 23 controls the first power converter 31 by vector control based on the torque current command value and the exciting current command value calculated in step S43 (step S44). When the processing in step S44 is complete, the components of the power conversion device 40 repeat the above processing from step S41.

The power conversion device 40 according to Embodiment 3 calculates the torque current command value and the exciting current command value in accordance with the target torque of the power generator 14 calculated based on the output power of the first power converter 31, as described above. The power conversion device 20 performs vector control based on the calculated torque current command value and the calculated exciting current command value, and controls the power-generation torque of the power generator 14.

The absolute values of the torque current command value and the exciting current command value calculated during power generation by the power generator 14 have a positive correlation. Thus, the absolute values of the torque current command value and the exciting current command value vary together in accordance with the operation state of the load 51, or more specifically, the output power of the first power converter 31. Thus, the efficiency of the power generator 14 is higher than when vector control is performed with the exciting current command value maintained constantly.

Embodiments of the present disclosure are not limited to the embodiments described above. The hardware configuration and the flowcharts described above are examples, and may be changed or modified as appropriate.

The drive control apparatuses 1 to 3 are not limited to use for a railway vehicle, and can drive any vehicle such as an automobile, a ship, and an aircraft.

The power conversion devices 20, 30, and 40 can be installed at any position such as under the floor, on the floor, and on the roof of the railway vehicle.

The circuit structures of the power conversion devices 20, 30, and 40 are examples. The circuit structures of the power conversion devices 20, 30, and 40 may be any circuit structure that can perform initial excitation of the power generator 14 and control the output torque of the power generator 14.

The power conversion devices 20, 30, and 40 may include, instead of the contactor MC1, any element that electrically connects the filter capacitor FC1 to the power converters 21 and 27 or electrically disconnects the filter capacitor FC1 from the power converters 21 and 27.

The target torque calculator 22 may acquire the rotational speed of the three-phase induction motor that is the load 51 from an automatic train control (ATC), a train information management system, or the like, and multiply the rotational speed of the three-phase induction motor acquired from the ATC by the torque of the three-phase induction motor calculated based on the measured values of phase current acquired from the current measurer CT2 to calculate the output power of the second power converter 32.

The target torque calculator 22 may calculate the target torque based on the effective power output by the second power converter 32 or the sum of the effective power output by the second power converters 32 and 33.

A method for calculating the target torque performed by the target torque calculator 22 is not limited to the above examples, and may be any method for calculating the target torque in accordance with the operation state of the load 51. For example, the target torque calculator 22 may acquire the operation command signal S2, estimate the operation state of the load 51 in accordance with the operation command signal S2, and calculate the target torque in accordance with the estimated operation state of the load 51.

The power storage 24 may be charged with the output power of the first power converter 31 after the power generator 14 starts to generate power, or may be charged with the power generated by the load 51 during braking of the railway vehicle. In this case, the target torque calculator 22 may calculate the target torque in accordance with the charge-discharge capacity of the power storage 24, in addition to the operation states of the loads 51 and 52. For example, when the power storage 24 is charged with the output power of the first power converter 31 after the power generator 14 starts to generate power, the target torque calculator 22 in the power conversion device 20 according to Embodiment 1 may calculate the target torque based on the sum of the output power of the second power converter 32 and power used to charge the power storage 24.

The power conversion devices 20, 30, and 40 may not include the power storage 24, and the filter capacitor FC1 may be charged with power supplied from an external apparatus until the initial excitation of the power generator 14 can be performed.

Control by the contactor controller 25 is not limited to the above examples. For example, the contactor controller 25 may acquire the rotational speed of the power source 11 from the speed sensor 13 and turn on the contactor MC1 when the rotational speed reaches a value that is expected to indicate the start of the power source 11. For example, the contactor controller 25 may turn on the contactor MC1 after the start command signal S1 changes from the L level to the H level and a predetermined time that is longer than a time taken to start the power source 11 elapses.

Although the measurement of the U-phase current, the V-phase current, and the W-phase current by the current measurers CT1 and CT2 is described, at least two of the U-phase current, the V-phase current, and the W-phase current may be measured.

The loads 51 and 52 to which the drive control apparatuses 1 to 3 supply power are not limited to the above examples, and may be any electronic apparatus that consumes power.

The power source 11 is not limited to the above examples, and may be, for example, an internal-combustion engine including no self-starting motor.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 2, 3 Drive control apparatus
11 Power source
12 Power source controller
13, 26 Speed sensor
14 Power generator
20, 30, 40 Power conversion device
21, 27 Power converter
22 Target torque calculator
23 Power conversion controller
24 Power storage
25 Contactor controller
31 First power converter
32, 33 Second power converter
51, 52 Load
60 Bus
61 Processor
62 Memory
63 Interface
CT1, CT2, CT3, CT4 Current measurer
FC1 Filter capacitor
MC1 Contactor
S1 Start command signal
S2 Operation command signal
S3 Switching control signal
S4 Contactor control signal
VT1, VT2 Voltage measurer

The invention claimed is:

1. A power conversion device comprising:
   power converting circuitry to (i) supply exciting power to a power generator drivable in an excitation state by a power source to generate power, (ii) convert the power generated by the power generator into power to be supplied to a load, and (iii) supply the power resulting from the conversion to the load;
   target torque calculating circuitry to calculate a target torque of the power generator in accordance with an operation state of the load; and
   power conversion controlling circuitry to, during the power generation by the power generator, (i) calculate a torque current command value and an exciting current command value for causing an output torque of the power generator to approach the target torque and (ii) control the power converting circuitry based on the calculated torque current command value and the calculated exciting current command value, wherein
   absolute values of the torque current command value and the exciting current command value calculated by the power conversion controlling circuitry during the power generation by the power generator have a positive correlation.

2. The power conversion device according to claim 1, wherein
   the power converting circuitry includes
      first power converting circuitry controllable by the power conversion controlling circuitry to convert power supplied through primary terminals from the power generator into direct current power and output the direct current power resulting from the conversion from secondary terminals, and
      a capacitor connected between the secondary terminals of the first power converting circuitry.

3. The power conversion device according to claim 2, wherein the target torque calculating circuitry calculates the target torque using output power of the first power converting circuitry as a value representing the operation state of the load.

4. The power conversion device according to claim 2, wherein
   the power converting circuitry further includes at least one second power converting circuitry to convert the direct current power supplied through the capacitor into the power to be supplied to the load and supply the power resulting from the conversion to the load, and
   the target torque calculating circuitry calculates the target torque using output power of the at least one second power converting circuitry as a value representing the operation state of the load.

5. The power conversion device according to claim 4, wherein
   the target torque calculating circuitry calculates the target torque using a sum of the output power of the at least one second power converting circuitry as the value representing the operation state of the load.

6. The power conversion device according to claim 2, further comprising:
   a power storage connected to the capacitor, wherein
   the first power converting circuitry is controllable by the power conversion controlling circuitry to receive supply of direct current power through the secondary terminals from the power storage and output exciting power for initial excitation of the power generator from the primary terminals.

7. The power conversion device according to claim 3, further comprising:
   a power storage connected to the capacitor, wherein
   the first power converting circuitry is controllable by the power conversion controlling circuitry to receive supply of direct current power through the secondary terminals from the power storage and output exciting power for initial excitation of the power generator from the primary terminals.

8. The power conversion device according to claim 6, wherein the power storage is charged with power supplied through the capacitor from the first power converting circuitry.

9. The power conversion device according to claim 7, wherein the power storage is charged with power supplied through the capacitor from the first power converting circuitry.

10. The power conversion device according to claim 6, wherein the target torque calculating circuitry calculates the target torque in accordance with the operation state of the load and a charge-discharge capacity of the power storage.

11. The power conversion device according to claim 7, wherein the target torque calculating circuitry calculates the target torque in accordance with the operation state of the load and a charge-discharge capacity of the power storage.

12. The power conversion device according to claim 8, wherein the target torque calculating circuitry calculates the target torque in accordance with the operation state of the load and a charge-discharge capacity of the power storage.

13. The power conversion device according to claim 9, wherein the target torque calculating circuitry calculates the target torque in accordance with the operation state of the load and a charge-discharge capacity of the power storage.

14. The power conversion device according to claim 1, wherein the absolute value of the exciting current command value calculated by the power conversion controlling circuitry during the power generation by the power generator is greater than or equal to the absolute value of the torque current command value calculated by the power conversion controlling circuitry during the power generation by the power generator.

15. The power conversion device according to claim 2, wherein the absolute value of the exciting current command value calculated by the power conversion controlling circuitry during the power generation by the power generator is greater than or equal to the absolute value of the torque current command value calculated by the power conversion controlling circuitry during the power generation by the power generator.

16. The power conversion device according to claim 3, wherein the absolute value of the exciting current command value calculated by the power conversion controlling circuitry during the power generation by the power generator is greater than or equal to the absolute value of the torque current command value calculated by the power conversion controlling circuitry during the power generation by the power generator.

17. The power conversion device according to claim 1, wherein the absolute values of the torque current command value and the exciting current command value calculated by the power conversion controlling circuitry during the power generation by the power generator are substantially equal to each other.

18. The power conversion device according to claim 2, wherein the absolute values of the torque current command value and the exciting current command value calculated by the power conversion controlling circuitry during the power generation by the power generator are substantially equal to each other.

19. The power conversion device according to claim 3, wherein the absolute values of the torque current command value and the exciting current command value calculated by the power conversion controlling circuitry during the power generation by the power generator are substantially equal to each other.

20. A drive control apparatus to be mounted on a vehicle, the drive control apparatus comprising:
- the power conversion device according to claim 1; and
- a power source to drive the power generator in the power conversion device, wherein
- the load to which power is to be supplied by the power converting circuitry in the power conversion device is an electric motor to drive the vehicle.

* * * * *